United States Patent
Bobzin

(10) Patent No.: US 9,372,699 B2
(45) Date of Patent: Jun. 21, 2016

(54) SYSTEM AND METHOD FOR PROCESSING REQUESTS TO ALTER SYSTEM SECURITY DATABASES AND FIRMWARE STORES IN A UNIFIED EXTENSIBLE FIRMWARE INTERFACE-COMPLIANT COMPUTING DEVICE

(75) Inventor: Jeffery Jay Bobzin, Harvard, MA (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 13/441,198

(22) Filed: Apr. 6, 2012

(65) Prior Publication Data
US 2012/0260082 A1    Oct. 11, 2012

Related U.S. Application Data

(60) Provisional application No. 61/473,234, filed on Apr. 8, 2011.

(51) Int. Cl.
*G06F 21/44* (2013.01)
*G06F 21/57* (2013.01)
*G06F 9/44* (2006.01)

(52) U.S. Cl.
CPC ............. *G06F 9/4411* (2013.01); *G06F 21/572* (2013.01)

(58) Field of Classification Search
CPC .......... G06F 21/572; G06F 2221/2105; G06F 9/4411
USPC ........................................................ 713/176
See application file for complete search history.

(56) References Cited

U.S. PATENT DOCUMENTS

| | | |
|---|---|---|
| 6,591,362 B1 | 7/2003 | Li |
| 6,715,074 B1 | 3/2004 | Chaiken |
| 8,607,216 B2 * | 12/2013 | Ibrahim ................ G06F 21/572 717/168 |
| 2003/0196110 A1 * | 10/2003 | Lampson .............. G06F 9/4406 726/30 |
| 2005/0177709 A1 | 8/2005 | Kim |
| 2006/0143600 A1 * | 6/2006 | Cottrell ................ G06F 21/572 717/168 |
| 2007/0011322 A1 * | 1/2007 | Moiso ....................... G06F 9/54 709/225 |
| 2007/0038801 A1 | 2/2007 | Tanaka |
| 2007/0083768 A1 * | 4/2007 | Isogai et al. .................. 713/189 |
| 2008/0052781 A1 * | 2/2008 | Bogot ................ H04L 63/0428 726/26 |
| 2008/0083030 A1 * | 4/2008 | Durham .................... G06F 8/67 726/22 |
| 2009/0249120 A1 | 10/2009 | Yao et al. |
| 2010/0169666 A1 * | 7/2010 | Dewan .................... G06F 21/36 713/190 |
| 2010/0274910 A1 * | 10/2010 | Ghanaie-Sichanie . H04L 9/3234 709/229 |
| 2011/0131403 A1 * | 6/2011 | Ibrahim et al. .................... 713/2 |
| 2012/0072734 A1 * | 3/2012 | Wishman et al. ............. 713/189 |
| 2012/0084552 A1 * | 4/2012 | Sakthikumar et al. ........ 713/100 |
| 2012/0226895 A1 * | 9/2012 | Anderson et al. ................ 713/2 |

OTHER PUBLICATIONS

International Search Report and Written Opinion for Application No. PCT/US2012/032565, 7 pages, dated Sep. 27, 2012.

* cited by examiner

*Primary Examiner* — Linglan Edwards
(74) *Attorney, Agent, or Firm* — McCarter & English, LLP; John S. Curran

(57) ABSTRACT

A mechanism for allowing firmware in a UEFI-compliant device to implement the UEFI specification driver signing and Authenticated Variable elements while at the same time protecting the system security database holding the library of approved keys and lists of allowed and forbidden programs from unauthorized modifications is discussed.

12 Claims, 3 Drawing Sheets

SYSTEM AND METHOD FOR PROCESSING REQUESTS TO ALTER SYSTEM SECURITY DATABASES AND FIRMWARE STORES IN A UNIFIED EXTENSIBLE FIRMWARE INTERFACE-COMPLIANT COMPUTING DEVICE

RELATED APPLICATION

This application is related to and claims the benefit of U.S. provisional patent application No. 61/473,234, entitled "System and Method for Processing Requests to Alter a System Security Database in a Unified Extensible Firmware Interface (UEFI)-Compliant Device, filed on Apr. 8, 2011, the contents of which are incorporated herein by reference in their entirety.

BACKGROUND

Unified Extensible Firmware Interface (UEFI) is a specification created by a non-profit industry body detailing a programming interface between the Operating System and the included firmware of a computing device such as (but not limited to) a Personal Computer (PC). UEFI specifications describe a set of tools by which a computing device can move in an organized fashion from the power-applied state to fully operational. The computing device is initialized by firmware included within the device and this firmware provides a range of software services which facilitate the boot of the operating system as well as providing a smaller subset of these services that continue to be available after operating system has booted. The UEFI specification tells the desired result but deliberately does not specify the internal tactic of implementation. The UEFI firmware specification replaces earlier OS/firmware interfaces previously used by the industry and commonly known as legacy BIOS.

The UEFI specification provides a facility called driver signature checking by which software from other parties can be 'signed' using public/private key cryptographic techniques at its origin. This signature is validated by the computing device firmware prior to allowing this software to operate. The signature checking concentrates on software added to configure optional components (plug-in boards) and software supplied by the operating system for early boot steps (OS boot loaders). The signature checking is accomplished with a library of approved keys. The computing device must take care to not allow unauthorized software elements any ability to modify the library of approved keys as this would allow rogue software elements to defeat the signature checking.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM. Among other services, the firmware is responsible for operation of the computing device until a boot process can be run which loads an operating system for the computing device into memory. Once loaded, the operating system is in charge of normal operation of the computing device. Of note, anti-virus programs for the computing device require the operating system to be loaded before they can function.

The contents of a Flash ROM may be logically partitioned into several functional divisions or regions. One such region is the firmware store which includes the loadable image of startup firmware and security firmware modules and must be protected from alteration by any entity except for entities that have been authorized to update the firmware store. A second region called the Authenticated Variable Region or Store holds Authenticated Variables defined in the UEFI specification and is used to hold UEFI-defined security information (the security database). In addition to the UEFI-defined information the Authenticated Variable Store can be used to store user-defined data related to the ultimate uses of the computer. Because it contains security data and potentially sensitive user data the UEFI specification provides that the Authenticated Variable Region/Store must be protected from alteration by any entity except those authorized by the presence of identifying key data within the security database. A third region, the UEFI variable store, contains lower security information which may be freely updated by user programs. On various platforms certain other regions exist each with unique update restrictions and the method describe herein can be extended to protect against unauthorized modification to these regions as well.

The computing device contains one or more elements known as Central Processing Units (CPU) which, when in operation, can read from and also perform input-output commands to erase and/or write the flash ROM. The CPU has a normal operating mode and a second operating mode called System Management Mode (SMM). When the CPU is in normal operating mode it can access all elements of the computer except certain memory regions exclusively dedicated to SMM. In contrast, when the CPU is operating in SMM it is able to access all elements of the computing device including the dedicated memory. An electrical signal is made available within the circuitry of the computing device which can indicate when the CPU is operating within SMM. The CPU device may be directed to transition from normal operating mode to SMM by a number of triggers called System Manage Interrupt (SMI) events including SMI events triggered by firmware. The exact triggers available differ somewhat from among system designs but the result when the platform appropriate trigger is used is always that execution in main memory is immediately suspended and execution begins at a specific location in SMM memory. Certain computing devices also contain a hardware circuit that can detect if the system is in SMM and is able to disable flash ROM erase and write operations when the system is not in SMM.

Unfortunately, there exists today a wide variety of software created by unauthorized third parties with the explicit intent to damage or subvert the proper operation of computing devices such as PCs. Given the names 'computer virus' or 'malware', these rogue software elements increasingly target the boot process as a way to get control of a computing device before preventive (e.g.: anti-virus) software has loaded. Exemplary forms of boot attacking software are known as root-kits or the 'Trojan Boot Virus'.

There is a need to occasionally update the firmware and related data contained in the flash ROM (or other ROM) without compromising security of the computing device by allowing root kits or Trojan Boot viruses access to the firmware. While the Flash ROM may have intrinsic protection devices known as block write enables, these are not suitable for protection of a flash-resident data item that needs an update during system operation while restricting the ability to perform the update only to those originated by a trusted authority. The intrinsic flash ROM protection is generally composed of arrays of bits that when set prevent writes to a sub-region. This type of complete write prevention however does not allow selective updates performed by trusted authorities.

BRIEF SUMMARY

The embodiments of the present invention provide a mechanism for allowing firmware in a UEFI-compliant device to implement the UEFI specification driver signature checking and Authenticated Variable elements while at the same time preventing unauthorized modification to regions of a flash ROM. By the process described herein protection from unauthorized modification which would render the computing device vulnerable to attack by malicious software is provided to a number of security-critical elements including: (1) the Authenticated Variable region of the flash ROM containing the security database; (2) those portions of the flash ROM firmware store containing the loadable image of the firmware modules; and (3) the executable image in SMM memory of the firmware modules which check authorization and perform updates to the security database and firmware store regions of the flash ROM. The security database contained in the Authenticated Variable region holds various information including the library of approved keys and lists of allowed and forbidden programs while the portion of the firmware store containing the loadable image of the firmware modules includes both the startup firmware and security firmware modules. More specifically, the embodiments of the present invention utilize firmware modules which are only able to be accessed and executed when the CPU is in SMM. As a result, the firmware modules of the present invention are hidden from examination and modification by an OS or user programs and may perform the security processing of the UEFI signature check and other techniques in a manner difficult to observe or modify.

In one embodiment a method for processing system security database requests in a Unified Extensible Firmware Interface (UEFI)-compliant computing device includes the step of receiving a signed system security database modification request from an operating system module. The signed request seeks to perform an alteration of a system security database in the UEFI-compliant computing device. The request is processed by a firmware request reception module composed of code that is accessible when a central processing unit (CPU) in the computing device is operating in a normal CPU mode. The method triggers a transition of the CPU from the normal CPU mode to a System Management Mode (SMM) using the request reception module and verifies a legitimacy of the processed request for performing an alteration of a system security database with a firmware verification module that is only executable when the CPU is in SMM. The method additionally validates a signature contained in the processed request for performing an alteration of the system security database. The validating occurs using a firmware validation module that is only executable when the CPU is in SMM. The method performs the alteration of the system security database requested using a firmware update module following a successful validation of the signature in the request. The firmware update module is only executable when the CPU is in SMM.

In another embodiment, a method for updating a firmware store region in a flash Read-Only Memory (ROM) in a Unified Extensible Firmware Interface (UEFI)-compliant computing device includes receiving at the UEFI-compliant device a downloaded update package that includes an executable update program, a replacement image of the firmware store and a signed hash of the replacement image. The method also includes the step of triggering with the update program, while a central processing unit (CPU) in the UEFI-compliant computing device is operating in a normal CPU mode, a transition of the CPU from the normal CPU mode to a System Management Mode (SMM). The method further validates the signature and replacement image with SMM-resident firmware that is only executable when the CPU is in SMM and updates the firmware store with the replacement image. The updating occurs using SMM-resident firmware that is only executable when the CPU is in SMM.

In an embodiment, a Unified Extensible Firmware Interface (UEFI)-compliant computing device includes a central processing unit (CPU) configured to execute a firmware request reception module. The request reception module receives and processes a signed system security database modification request from an operating system module. The request seeks to perform an alteration of a system security database in the UEFI-compliant computing device. The request reception module is executable when the CPU is operating in a normal CPU mode and triggers a transition of the CPU from the normal CPU mode to a System Management Mode (SMM) after processing the received request. The CPU also executes a firmware verification module that verifies a legitimacy of the processed request for performing an alteration of a system security database. The firmware verification module executes only when the CPU is in SMM. The CPU further executes a firmware validation module. The firmware validation module validates a signature contained in the processed request for performing an alteration of the system security database. The firmware validation module also executes only when the CPU is in SMM. The CPU additionally executes a firmware update module. The firmware update module performs the requested alteration of the system security database following a successful validation of the signature. The firmware update module executes only when the CPU is in SMM.

In another embodiment, a Unified Extensible Firmware Interface (UEFI)-compliant computing device, includes a central processing unit (CPU) configured to execute a downloaded update package that includes an executable update program for updating a firmware store region in a flash Read-Only Memory (ROM) in the UEFI-compliant computing device. The update package further includes a replacement image of at least part of the firmware store and a signed hash of the replacement image. The update program triggers a transition of the CPU from a normal CPU mode to a System Management Mode (SMM). The CPU in the device also executes SMM-resident firmware for validating the signature and replacement image. The SMM-resident firmware for validating the signature and replacement image only executes when the CPU is in SMM mode. Additionally, the CPU in the device executes SMM-resident firmware for updating the firmware store with the replacement image. The SMM-resident firmware for updating the firmware store only executes when the CPU is in SMM mode.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention provide a mechanism for a UEFI-compliant computing device to perform the driver signature checking of software updates that is discussed in the UEFI specification in a manner which greatly limits the ability of malware to tamper with the library of approved keys and other information held in the system security database. By limiting access to the Authenticated Variables holding the system security database and associated information to the techniques discussed herein, the security processing envisioned by UEFI can be implemented by restricting the processing to occurring inside SMM. As SMM memory is hidden from examination by an OS or other program, the ability of unauthorized third parties to observe and then modify the security process becomes significantly diminished.

One of the major security features of the UEFI specification is that lists of allowed and forbidden programs, allowed or forbidden to perform certain types of software updates requiring signature checking, and the identification of agents able to add to these lists, is maintained by the UEFI-compliant computing device. However, if the computer instructions to modify the lists and allow agents are present in normal memory (accessible when the CPU is in normal operating mode), the ability to determine the authenticity of the instructions is greatly compromised as the instructions could be from malicious software operating in the same memory space rather than from legitimate security software. The embodiments of the present invention address this issue by ensuring that only software approved and checked by the manufacturer can be resident in SMM memory and that all specified security updates are processed only when the CPU is in SMM.

The embodiments of the present invention close and lock access to SMM memory prior to execution of any software not specified and loaded at the factory with the factory image undergoing post-factory amendments only as applied by the secure firmware update process described herein. This restriction on access and amendment greatly enhances the ability of the computing device to perform the signature checking envisioned in the UEFI specification. Through the use of firmware modules focused on the secure processing of update requests, the updates may be handled so as to ensure the requests only originate from valid entities.

Figure 1:
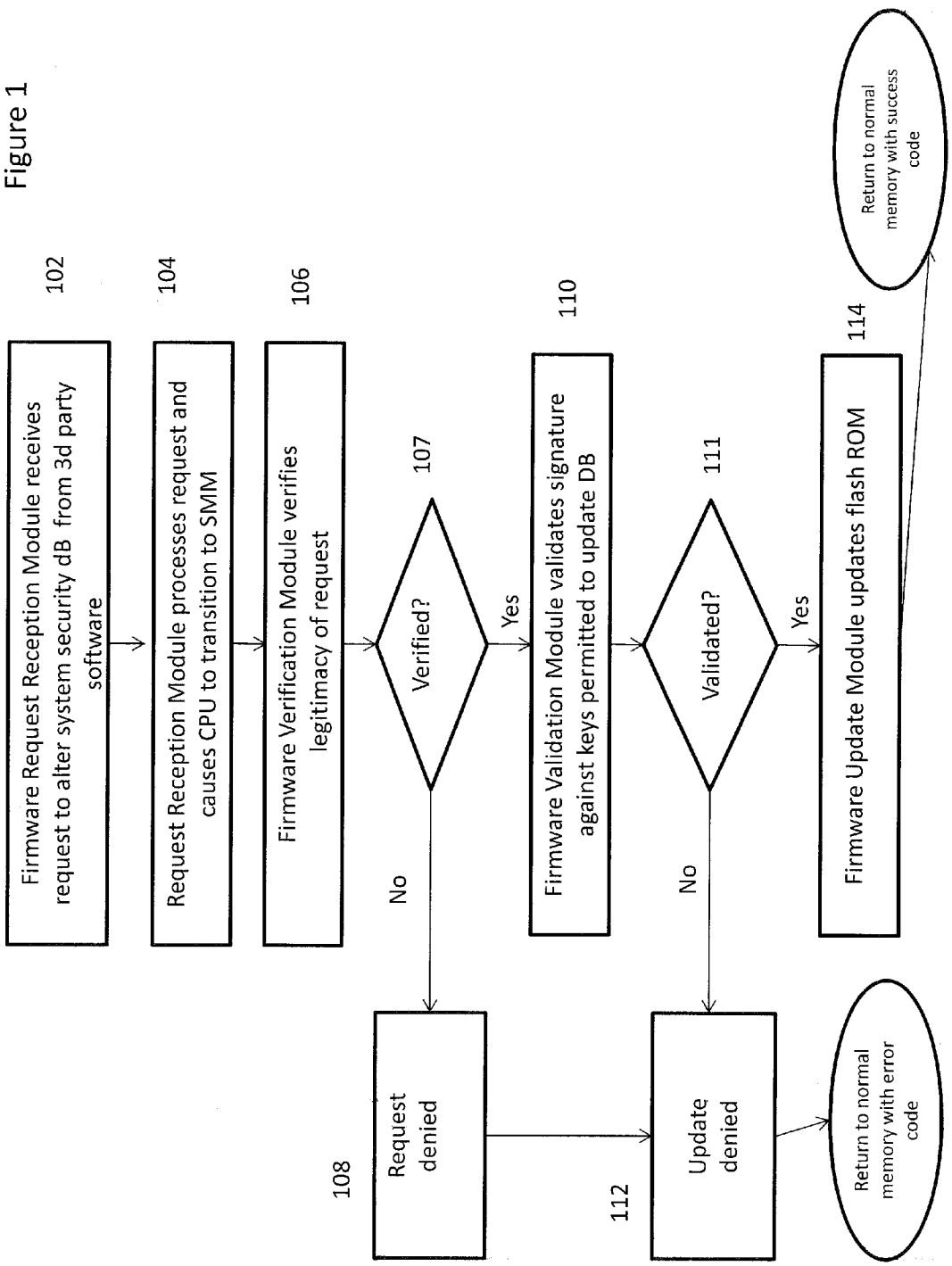
FIG. 1 depicts an exemplary sequence of steps performed by an embodiment of the present invention to utilize firmware modules in a UEFI compliant device.

FIG. 1 depicts an exemplary sequence of steps performed by an embodiment of the present invention to utilize firmware modules in a UEFI compliant device. The sequence begins when a firmware request reception module receives a signed request for a software update that would require the alteration of an Authenticated Variable such as that variable holding the system security database that includes the library of approved keys used to perform signature checking (step 102). The request may be received via the UEFI run-time interface. Of note, the firmware request reception module is operable and accessible when the CPU is operating in normal mode. Upon receiving the request, the firmware request reception module checks the request format and saves certain memory location information for the use of SMM-based code and causes the CPU to transition to SMM by a specific method appropriate to the system platform for the processing of the request (step 104). For example, in some systems the transition may be triggered by invocation of an SMI interrupt. Once the CPU is operating in SMM, a firmware verification module which only operates when the CPU is operating in SMM receives the request and verifies that it is actually from the firmware request reception module (step 106) by checking the location in memory of the SMM request against previously noted request reception module load address and by examining the image of the Package module in memory to confirm the image has not been altered. If the request is not verified, the request is denied (step 108). It will be appreciated that the invalid request may trigger a displayed or logged alert, and the return of a UEFI defined error code to software requesting the update. If the request is verified as coming from the request reception module a firmware validation module that is only operable in SMM examines the signature information included in the database update request and performs signature checking using at least one key in the system security database (step 110). It should be noted that in other embodiments the system can be operated in conditions of greater or lesser security and the exact policy or rules for signature checking may differ according to the state of the system. Regardless of these variations in condition however, for embodiments of the present invention, the currently applicable policy for signature checking is applied by the SMM resident module according to the state information recorded in the protected system security database.

The computing device may utilize public/private key encryption as part of an Authenticated Variable update validation process. The update request may include content and a signed hash of at least portions of content, the hash being signed or encrypted, by a private key held by the requesting entity. As part of the validation process, the validation module may recreate the hash of the portion of the update content that was signed using the same hashing algorithm, decrypt the signed hash with a corresponding and authorized public key from the system security database and compare the original hash to the new hash. If an authorized key does not exist in the system security database and/or the hashes are not identical, the request is not valid (step 112) and the update is refused. If the request is determined to be valid, a firmware update module that operates only when the CPU is in SMM processes the request and updates the flash ROM (step 114).

In one embodiment, a non-secure firmware request reception module that operates when the CPU is in normal mode may be used to receive requests for updates to flash regions not protected by signature update restrictions. The non-secure request reception module may package the requests and invoke SMM for processing. Once SMM is invoked these requests may be received and processed by a firmware module operating in SMM that performs the requested modifications to the non-secure region of the flash ROM. This processing is performed because SMM-based protection of the flash is for the entire device or devices and therefore all flash changes must be routed through SMM.

In one embodiment, the computing device may include a firmware module that controls the circuitry used to protect flash by the disable of flash erase and write operations that originate outside of SMM. When firmware starts execution after power is applied to the computing device, the Flash protection circuitry is not operational. Therefore a firmware module is provided which performs platform-specific operations to enable the flash protection circuitry at an appropriate point of boot operation prior to the introduction of any untrusted firmware. Once set, the flash protection circuitry is not reversible except by reset. Because the system returns to trusted code obtained from the flash ROM at reset this algorithm ensures at no point in the operation of the system is the flash firmware store available for alteration by untrusted code.

Figure 2:
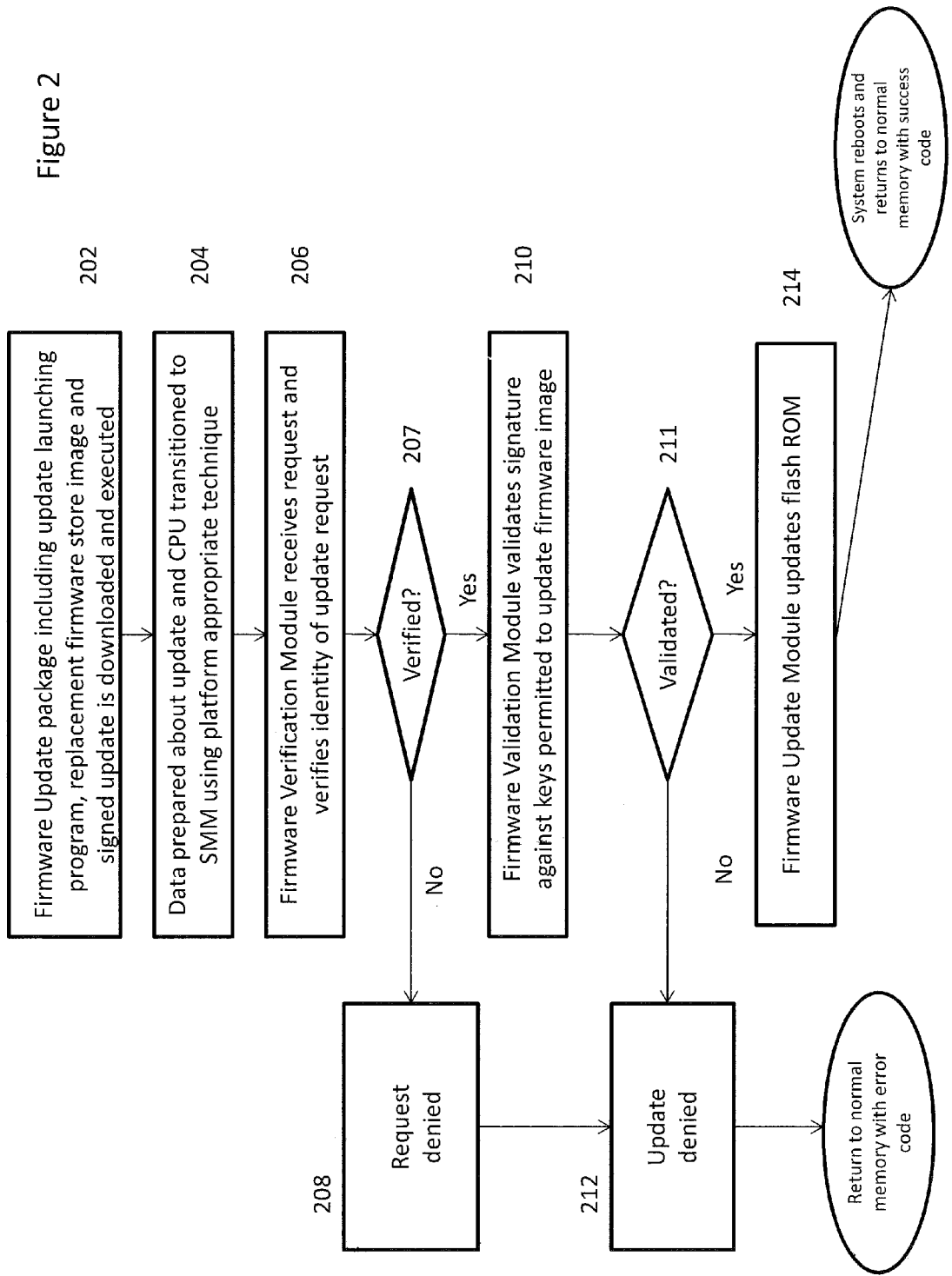
FIG. 2 depicts an exemplary sequence of steps performed by an embodiment of the present invention to utilize firmware modules in a UEFI compliant device for the purpose of updating the firmware store of a flash ROM.

FIG. 2 depicts an exemplary series of steps to use the mechanism described here to implement the process of updating all or a portion of the firmware store regions of the flash ROM. The process in general is similar to that described in FIG. 1 allowing for the reuse of many common firmware components and the efficient use of firmware resources but does include some differences. The sequence begins when a firmware update package is downloaded to a UEFI-compliant device and executed (step 202). The update package includes several parts including an update launching program which is an executable program designed to function in the installed operating system. In addition to the update launching program, the downloaded update package includes a replacement image for all, or a selected portion, of the firmware store as well as a data block containing instructions to the update program including, but not limited to, the system identifier of targeted system(s). The update package also includes a signed hash of the replacement image. The signed hash of the new image and the data block is prepared by cryptographic methods defined in the UEFI specification similarly to those described above for the signing of updates to the Authenticated Variable region. The bytes for all of the parts of the update package, are signed at the OEM site and checked by the firmware. The downloaded update package is signed in such a way as to make it possible for the firmware to determine that no portion of the download has been modified after it was created.

In one embodiment, in addition to the components detailed above, the downloaded package may also contain supplemental firmware modules to perform the actual process of erasing and writing the flash image. The supplemental firmware modules if present are also signed by the process described above and validated similarly.

In more detail, the update launching program loads into memory and checks the integrity of the other portions of the update package. If the download integrity check is successful the update launching program prepares memory location information for use in upcoming operations that will take place in SMM and signals a request to transition to SMM using a method appropriate to the device platform being updated (step 204). It will be appreciated that there may be a number of similar update launching programs each with different variations tailored to operate in specific operating systems and to function correctly on the platform to be updated within the scope of the present invention. As a result of the request, the CPU transitions to SMM via a platform appropriate technique (step 204). In one embodiment, once the CPU has switched to SMM, the firmware verification module which operates only within SMM may receive the update request and verify the identity of the requesting update launching program (step 206). For example, the request may be verified by checking the location in memory of the SMM request against a previously noted update launching program load address and by examining the image of the update package in memory to confirm the image has not been altered. If the request is not verified (step 207), the request and update are denied (steps 208 and 212) in which case the CPU returns to normal memory mode with an error code. On the other hand, if the request is verified (step 207), a firmware validation module which operates only in SMM attempts to validate the update request by verifying the replacement firmware image using the signed hash. There may be one or potentially multiple public keys resident in the factory-installed flash ROM image that are enabled for validation of firmware update image signatures. These keys reside in one of the protected regions but may or may not reside in the Authenticated Variable region according to the particular requirements of the system. The SMM-resident firmware validation module that receives the update request first performs the cryptographic checks required to verify that the update submitted by the update program was signed by a private key authorized to perform firmware updates. Only if the cryptographic checks pass will the update be passed along to the firmware responsibility for erasing and writing the firmware store region, otherwise the update will be denied (step 212). On the other hand, following a successful validation, a firmware update module that is only executable when the CPU is in SMM updates the firmware store (step 214). Following the update of the firmware store, the UEFI-device will reboot before returning to normal memory with a success code for the update operation. In some embodiments, for additional security, additional security precautions may be taken. For example, in one embodiment, the UEFI-device may reboot following validation and before the firmware update is performed. Upon returning to the update process, the update package may again be validated before the update is performed. In such an implementation, the UEFI device would reboot a second time following the update before returning to normal memory.

The actual erasing and writing of the flash ROM can require a number of seconds and while the system is in SMM it is not responsive to other user programs. So as to provide a better user experience when large updates are required, in one embodiment, the actual processing of the update may be broken into smaller portions by the mechanism of returning to the caller in main memory—either the variable update packager or the update program, with a flag indicating partial completion. This break in operation may potentially occur several times. After receiving this partial completion flag, the caller suspends operation for some brief time period to allow other user programs to briefly execute and then reenters SMM with a continuation flag. In the case of the update program a visual progress indication on the user screen may be updated upon return to main memory. Upon re-entry to SMM, the SMM firmware takes any steps required to make sure that the memory image of the update in progress was not modified during the suspension. This optional step is omitted from FIGS. 1 and 2 only for clarity.

Figure 3:
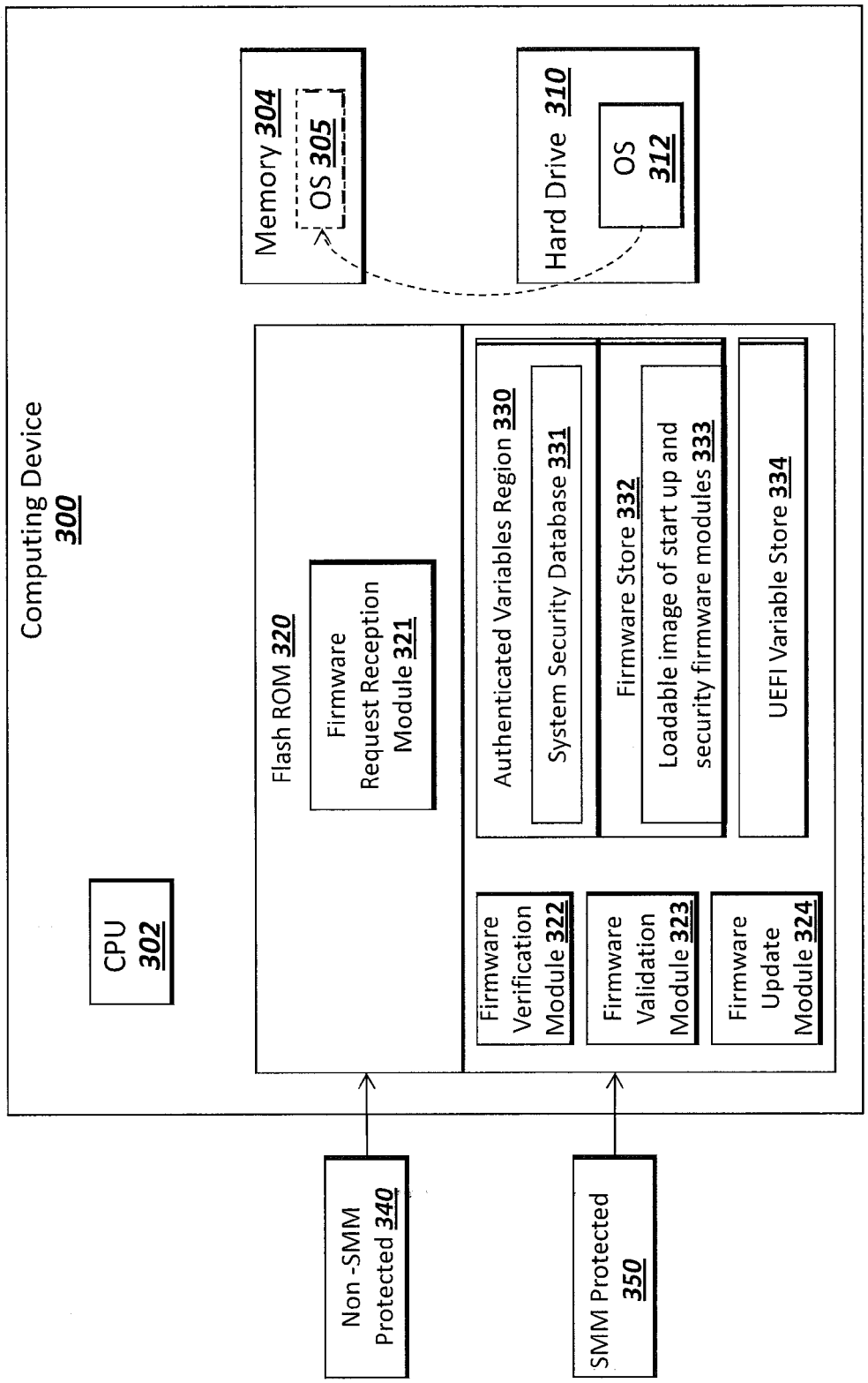
FIG. 3 depicts an exemplary environment suitable for practicing embodiments of the present invention

FIG. 3 depicts an exemplary environment suitable for practicing embodiments of the present invention. A UEFI-compliant computing device 300 includes a CPU 302 able to operate in normal mode and SMM. The computing device 300 which may be a PC, laptop computer, tablet computing device, server, smartphone or some other type of computing device equipped with a processor and able to comply with the requirements of the UEFI specification. The computing device 300 may also include a memory 304 such as Random Access Memory (RAM). An operating system 312 stored on a hard drive or equivalent mass storage device, in, or in communication with, computing device 300, may be loaded into memory 304 as part of a boot process performed by the computing device.

The computing device 300 may also include flash ROM 320. In some cases the system design may incorporate multiple flash ROM devices. In the event multiple flash ROM devices are employed, all of the flash ROM devices may be accessed using the same procedures and subject to the same security process as set forth above. Flash ROM 320 may include firmware modules as described above that are operable at different points of the computing device's operation. For example, flash ROM 320 may include a firmware request reception module 321 that is operable when the CPU 302 is in a normal operation (non-SMM operation) 340. The flash ROM 320 may also hold a firmware verification module 322, a firmware validation module 323 and a firmware update module 324 that are operable only when the CPU is operating in SMM 350. Although the description herein describes the firmware verification module 322, firmware validation module 323 and firmware update module 324 as separate modules, it should be appreciated that the functionality of the modules may be combined into a lesser or greater number of modules without departing from the scope of the present invention.

The flash ROM 320 may be logically partitioned into several functional regions. Thus, flash ROM 320 may include authenticated variables region 330 holding system security database 331. System security database 331 holds authorized keys used for signature checking as set forth in the UEFI specification and is only accessible when the CPU is operating in SMM 350. Similarly, flash ROM 320 may also include firmware store 332 which holds the loadable image of start up and security firmware modules 333. Flash ROM 320 may also include UEFI variable store region 334. It should be appreciated that flash ROM 320 may be logically divided to include other regions different from or encompassing the regions discussed herein in a different manner without departing from the scope of the present invention.

Embodiments of the present invention may be provided in whole or in part as one or more non-transitory computer-readable programs embodied on or in one or more physical mediums. For example, the mediums may be a floppy disk, a hard disk, a compact disc, a digital versatile disc, flash memory, a PROM, an MRAM, a RAM, a ROM, or a magnetic tape. In general, the computer-readable programs may be implemented in any programming language. Some examples of languages that can be used include FORTRAN, C, C++, C#, Python, ActionScript, JavaScript, or Java. The software programs may be stored on, or in, one or more mediums as object code. Hardware acceleration may be used and all or a portion of the code may run on a FPGA, an Application Specific Integrated Processor (ASIP), or an Application Specific Integrated Circuit (ASIC). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention. Specifically it is noted that within certain embodiments, the steps described in FIG. 2 may be modified or replaced by comparable processes without requiring changes to the steps of FIG. 1. Further, while the description herein discusses various functionality attributed to specific software modules for ease of explanation, it will be appreciated that the modules may be named differently or combined or divided in a manner not specifically discussed so as to deliver the same functionality without departing from the scope of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A method for processing system security database requests in a Unified Extensible Firmware Interface (UEFI)-compliant computing device, comprising:
    receiving a signed system security database modification request from an operating system module, the request seeking to perform an alteration of a system security database in the UEFI-compliant computing device, the request processed by a firmware request reception module, the request reception module being executable when a central processing unit (CPU) in the computing device is operating in a normal CPU operating mode:
    saving, with the firmware request reception module, memory location information related to the system security database modification request for the use of a firmware verification module, the firmware verification module executable only when the CPU is in a System Management Mode (SMM), the memory location information saved prior to a triggering of a transition of the CPU from the normal CPU operating mode to SMM;
    triggering the transition of the CPU from the normal CPU operating mode to SMM using the request reception module;
    verifying an identity of the firmware request reception module with the firmware verification module, the verifying performed by checking a location in memory of the request against a previously noted request reception module load address to identify an origin of the processed request;
    validating a signature contained in the processed request for performing an alteration of the system security database, the validating occurring using a firmware validation module that is only executable when the CPU is in SMM; and
    performing the alteration of the system security database requested using a firmware update module, the alteration occurring following a successful validation of the signature, the firmware update module only executable when the CPU is in SMM.

2. The method of claim 1 wherein the firmware validation module validates the signature in the request for performing an alteration of a system security database using a key stored in the system security database.

3. The method of claim 1 wherein the firmware request reception module, firmware verification module, firmware validation module, firmware update module and the system security database are stored in flash ROM.

4. A method for updating a firmware store region in a flash Read-Only Memory (ROM) in a Unified Extensible Firmware Interface (UEFI)-compliant computing device, comprising:
    receiving at the UEFI-compliant device a downloaded update package that includes an executable update program, a replacement image of the firmware store and a signed hash of the replacement image;
    executing the update program while a central processing unit (CPU) in the UEFI-compliant computing device is operating in a normal CPU operating mode, the update program generating an update request for the firmware store region;
    saving, with the update program, memory location information related to the update package for use of firmware used to verify the update program, the firmware used to verify the update program being executable only when the CPU is in a System Management Mode (SMM), the memory location information saved prior to a triggering of a transition of the CPU from the normal CPU operating mode to SMM;

triggering with the update program, while the CPU is operating in the normal CPU operating mode, the transition of the CPU from the normal CPU operating mode to SMM;

verifying while the CPU is in SMM that the update request is from the update program, the verifying performed by checking a location in memory of the request against a previously noted update program load address to identify an origin of the update request;

validating the signature and replacement image with SMM-resident firmware that is only executable when the CPU is in SMM; and updating the firmware store with the replacement image, the updating occurring using SMM-resident firmware that is only executable when the CPU is in SMM.

5. The method of claim 4 wherein the UEFI-compliant device re-boots or shuts down following the validating and prior to the updating of the firmware store.

6. A non-transitory computer-readable medium holding computer-executable instructions for processing system security database requests in a Unified Extensible Firmware Interface (UEFI)-compliant computing device, the instructions when executed causing at least one computing device to:

receive a signed system security database modification request from an operating system module, the request seeking to perform an alteration of a system security database in the UEFI-compliant computing device, the request processed by a firmware request reception module, code for the request reception module being accessible when a central processing unit (CPU) in the computing device is operating in a normal CPU operating mode:

save, with the firmware request reception module, memory location information related to the system security database modification request for the use of a firmware verification module, the firmware verification module executable only when the CPU is in a System Management Mode (SMM), the memory location information saved prior to a triggering of a transition of the CPU from the normal CPU operating mode to SMM;

trigger the transition of the CPU from the normal CPU operating mode to SMM using the request reception module;

verify an identity of the firmware request reception module with the firmware verification module, the verifying performed by checking a location in memory of the request against a previously noted request reception module load address to identify an origin of the processed request;

validate a signature contained in the processed request for performing an alteration of the system security database, the validating occurring using a firmware validation module that is only executable when the CPU is in SMM; and perform the alteration of the system security database requested using a firmware update module, the alteration occurring following a successful validation of the signature, the firmware update module only executable when the CPU is in SMM.

7. The medium of claim 6 wherein the firmware validation module validates the signature in the request for performing an alteration of a system security database using a key stored in the system security database.

8. A non-transitory computer-readable medium holding computer-executable instructions for updating a firmware store region in a flash Read-Only Memory (ROM) in a Unified Extensible Firmware Interface (UEFI)-compliant computing device, the instructions when executed causing at least one computing device to:

receive at the UEFI-compliant device a downloaded update package that includes an executable update program, a replacement image of the firmware store and a signed hash of the replacement image;

execute the update program while a central processing unit (CPU) in the UEFI-compliant computing device is operating in a normal CPU operating mode, the update program generating an update request for the firmware store region;

save, with the update program, memory location information related to the update package for use of firmware used to verify the update program, the firmware used to verify the update program being executable only when the CPU is in a System Management Mode (SMM), the memory location information saved prior to a triggering of a transition of the CPU from the normal CPU operating mode to SMM;

trigger with the update program, while the CPU is operating in the normal CPU operating mode, the transition of the CPU from the normal CPU operating mode to SMM;

verify while the CPU is in SMM that the update request is from the update program, the verifying performed by checking a location in memory of the request against a previously noted update program load address to identify an origin of the update request;

validate the signature and replacement image with SMM-resident firmware that is only executable when the CPU is in SMM; and update the firmware store with the replacement image, the updating occurring using SMM-resident firmware that is only executable when the CPU is in SMM.

9. The medium of claim 8 wherein the UEFI-compliant device re-boots or shuts down following the validating and prior to the updating of the firmware store.

10. A Unified Extensible Firmware Interface (UEFI)-compliant computing device, comprising a central processing unit configured to execute:

a firmware request reception module for receiving and processing a signed system security database modification request from an operating system module, the request seeking to perform an alteration of a system security database in the UEFI-compliant computing device, the request reception module being executable when a central processing unit (CPU) in the computing device is operating in a normal CPU operating mode and saving memory location information related to the system security database modification request for the use of a firmware verification module, the firmware verification module executable only when the CPU is in a System Management Mode (SMM), the memory location information saved prior to triggering a transition of the CPU from the normal CPU operating mode to a SMM following the processing;

the firmware verification module for verifying an identity of the firmware request reception module, the verifying performed by checking a location in memory of the request against a previously noted request reception module load address to identify an origin of the processed request;

a firmware validation module for validating a signature contained in the processed request for performing an alteration of the system security database, the firmware validation module executing only when the CPU is in SMM; and a firmware update module for performing the requested alteration of the system security database following a successful validation of the signature, the firmware update module executing only when the CPU is in SMM.

11. The device of claim 10 wherein the firmware validation module validates the signature in the request for performing an alteration of a system security database using a key stored in the system security database.

12. A Unified Extensible Firmware Interface (UEFI)-compliant computing device, comprising a central processing unit (CPU) configured to execute:

a downloaded update package including an executable update program for updating a firmware store region in a flash Read-Only Memory (ROM) in the UEFI-compliant computing device, the update package further including a replacement image of at least part of the firmware store and a signed hash of the replacement image, the update program executing while the CPU in the UEFI-compliant computing device is operating in a normal CPU operating mode, the update program generating an update request for the firmware store region and triggering a transition of the CPU from the normal CPU operating mode to a System Management Mode (SMM) to update the firmware store with the replacement image, memory location information related to the update package saved by the update program for use by firmware used to verify the update program, the memory location information saved prior to the triggering of the transition of the CPU from the normal CPU operating mode to SMM by the update program;

the firmware used for verifying the update program, the firmware being executable only when the CPU is in a SMM, the verifying performed by checking a location in memory of the request against a previously noted update program load address to identify an origin of the update request;

firmware for validating the signature and replacement image, the firmware for validating the signature and replacement image only executing when the CPU is in SMM; and firmware for updating the firmware store with the replacement image, the firmware for updating the firmware store only executing when the CPU is in SMM.

* * * * *